United States Patent [19]

Plenzler et al.

[11] Patent Number: 5,044,922

[45] Date of Patent: Sep. 3, 1991

[54] APPARATUS FOR APPLYING LABELS IN THE MOLDS OF A PLASTIC BLOW MOLDING MACHINE

[75] Inventors: John A. Plenzler, Toledo, Ohio; Lawrence H. Weber, Ypsilanti, Mich.

[73] Assignee: Owens-Illinois Plastic Products Inc., Toledo, Ohio

[21] Appl. No.: 416,204

[22] Filed: Oct. 2, 1989

[51] Int. Cl.$^5$ .......................................... B29C 51/16
[52] U.S. Cl. .................................... 425/503; 264/509; 425/126.1; 425/145; 425/150; 425/538; 425/540
[58] Field of Search ...................... 264/509; 425/126.1, 425/503, 504, 522, 538, 528, 540, 145, 150

[56] References Cited

U.S. PATENT DOCUMENTS

| 4,359,314 | 11/1982 | Hellmer | 264/509 |
| 4,479,644 | 10/1984 | Bartimes et al. | 264/509 |
| 4,479,770 | 10/1984 | Slat et al. | 264/509 |
| 4,636,166 | 1/1987 | Franks et al. | 425/504 |
| 4,680,000 | 7/1989 | Nowicki et al. | 425/504 |
| 4,834,641 | 5/1989 | Keyser | 425/126.1 |
| 4,909,723 | 3/1990 | Slat et al. | 264/509 |

FOREIGN PATENT DOCUMENTS 0137588 4/1985 European Pat. Off. ......... 425/126.1

Primary Examiner—Willard E. Hoag

[57] ABSTRACT

Apparatus for applying labels in the molds of a plastic blow molding machine of the type wherein a plurality of sets of molds are mounted on a wheel rotatable about a horizontal axis. Mold sections are moved toward and away from one another to enclose a parison, and the parison is then blown to the confines of the cavity between the mold sections. The apparatus removes labels successively from one or more magazines, and deposits labels on an endless conveyor that transports the labels to a position adjacent an open mold. The apparatus laterally transfers the labels successively from the conveyor to a position within the mold section, such that when a mold closes about a plastic parison and the parison is blown, the labels become adhered to the blown plastic article. The label magazines are mounted in horizontal orientation, and the label pickup mechanisms are moved by a positive-action slider crank in a straight line for picking up and removing a label from the magazine, and in a straight line for delivering the label to the conveyor while the conveyor is stationary. The label placement apparatus is positively driven to remove the label from the conveyor while it is stationary and deliver it to the mold cavity.

13 Claims, 15 Drawing Sheets

FIG. 23

PNEUMATIC CIRCUITS
CARRIAGE
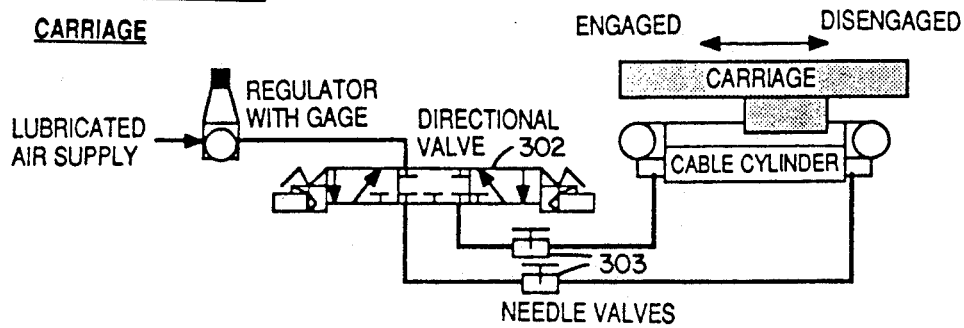
DRY AIR SUPPLY
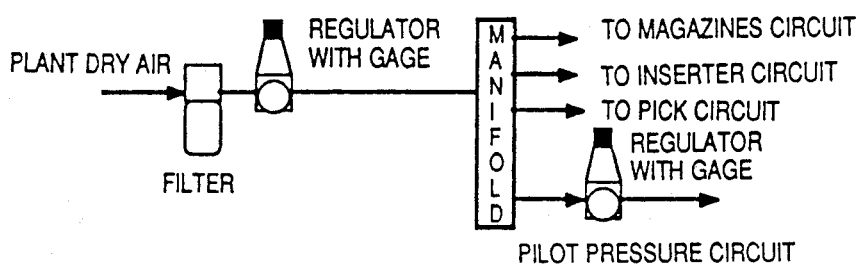
MAGAZINE
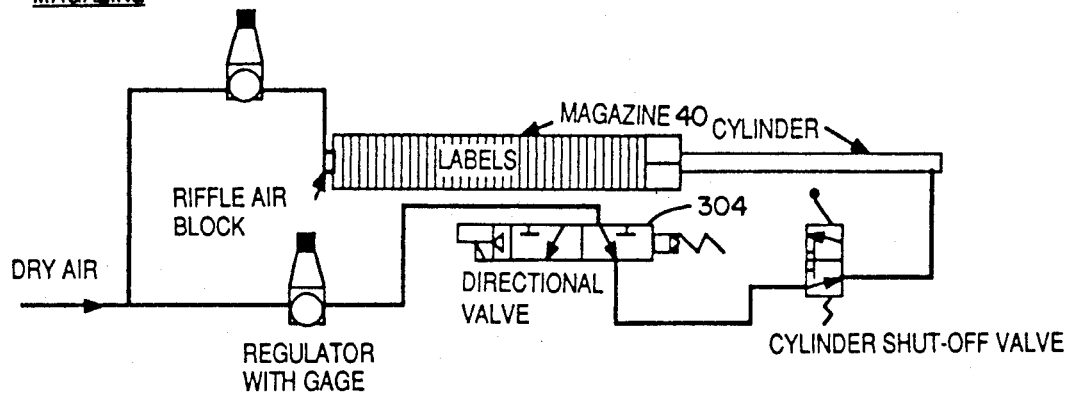
PICK HEADS
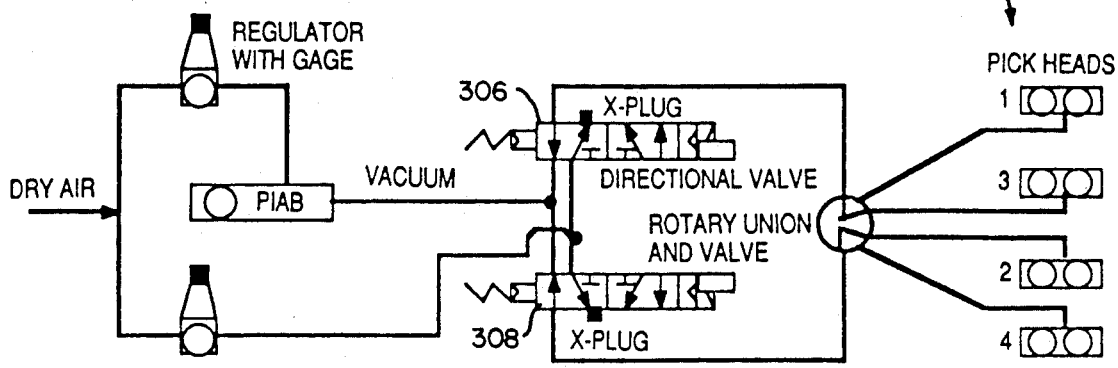
FIG.22A

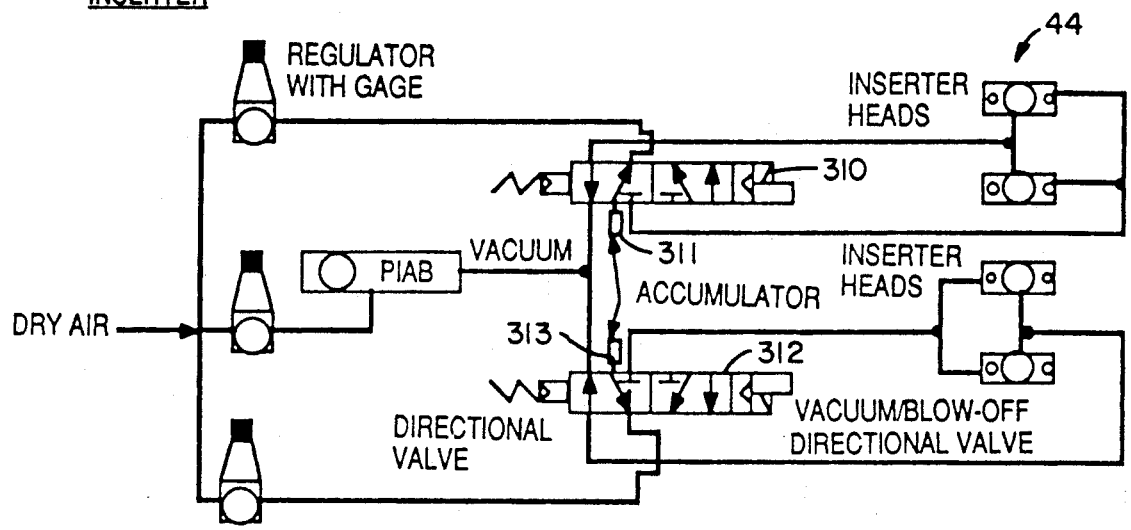
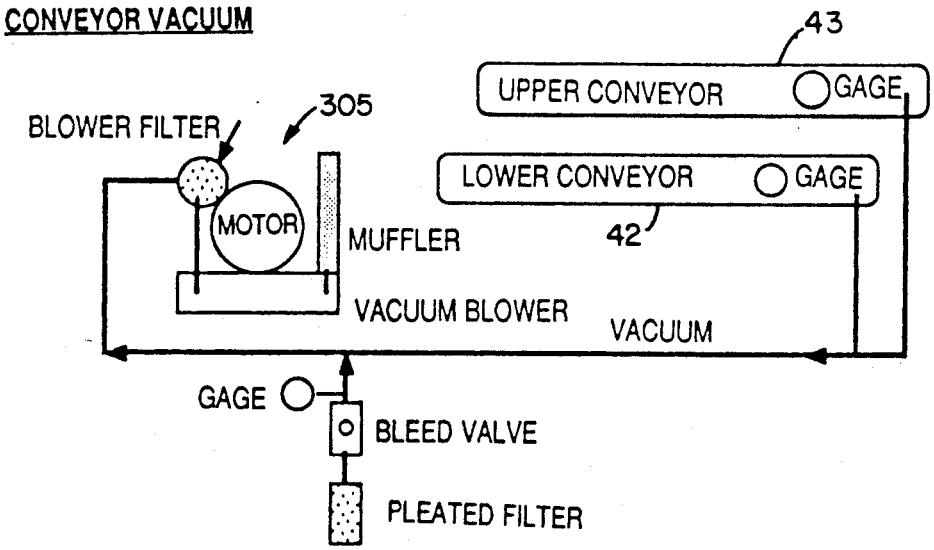
FIG.22B

APPARATUS FOR APPLYING LABELS IN THE MOLDS OF A PLASTIC BLOW MOLDING MACHINE

This invention relates to plastic blow molding machines, and particularly to apparatus for delivering labels to an open mold so that they can be adhered to the plastic article when the mold is closed about a parison and the parison is blown to the confines of the mold.

BACKGROUND OF THE INVENTION

It is conventional to make hollow plastic articles such as containers by closing a mold about a heated parison and blowing the parison outwardly against the confines of the mold to form the hollow article. Labels can be delivered to an open mold and deposited in the cavity of the mold so that, when the mold is closed and the parison is blown, the labels become adhered to and become a part of the blown hollow article. In U.S. Pat. No. 4,397,625, a reciprocating carriage is utilized to pick up labels from hoppers mounted on the frame of the blow molding machine and deliver them to the sections of the mold. Such an arrangement thus becomes a fixed part of the machine and provides for simultaneously delivering labels to both sections of the mold.

In certain types of machines, the space for delivery of the label into the open mold is limited because of the construction of the machine. More specifically, in one type of blow molding machine, a plurality of sets of molds are mounted on a wheel rotatable about a horizontal axis. The molds are movable toward and away from one another to enclose a parison, and the parison is then blown by application of air to the confines of the cavity between the mold sections as the wheel rotates. The blown articles are usually taken out of the blow molding machine at the twelve O'clock position and the extruded parison is introduced at the three O'clock position, such that the area during which the molds are open is limited. In such an arrangement, space is extremely limited, and the problem of placement of labels in the open mold is difficult. Where two labels are to be delivered for placement on opposite sides of the hollow article, the problem is more difficult. The problem is further complicated when the molds have plural cavities, and labels are to be delivered simultaneously to the plural cavities.

U.S. Pat. No. 4,680,000, assigned to the assignee hereof, discloses a method and apparatus for applying labels in the molds of a plastic blow molding machine in which labels are successively removed from one or more magazines, deposited on an endless conveyor that transports the labels to a position adjacent to an open mold, and laterally transferred from the conveyor to a position within the molds. When the mold closes about a plastic parison and the parison is blown, the labels become adhered to the blown plastic bottle. Although the technology disclosed in the noted patent has enjoyed substantial acceptance and success, further improvements remain desirable. For example, improvements are desirable in the pick-up arrangement for removing labels from the magazine and placing them on the conveyor. The pick-up mechanism of the noted patent includes a pair of spring-biased cam-operated linkage arms that undesirably expand due to centrifugal force during operation, and are difficult to control for removing labels from an angulated magazine and placing them on a continuously moving conveyor. Likewise, it is difficult to control motion of the inserter in the device of the noted patent accurately to remove labels from the conveyor and position them in the mold sections.

OBJECTS AND SUMMARY OF THE INVENTION

Accordingly, among the objectives of the invention are to provide a method and apparatus for delivering labels between the sections of an open mold, which method and apparatus are particularly applicable to a machine of the wheel type above defined, which can be utilized to apply two labels to opposite sides of a hollow article, which can be applied to multiple cavity molds such as dual cavity molds, which will accommodate various size labels, which can be readily converted from use with single cavity to double cavity molds, in which label delivery can be interrupted without moving the label delivery apparatus from its position adjacent the blow molding machine so that the blow molding machine can continue to be used, and which are readily synchronized in movement with the plastic blow molding machine.

More specific objects of the present invention are to provide an improved method and apparatus for applying labels of the general type shown in the aforementioned U.S. Pat. No. 4,680,000 that facilitate improved positioning of magazines, that provide for placement of the labels on the conveyor while the conveyor is stationary, in which the apparatus includes improved label pickup mechanism, in which the label pickup mechanism is not affected by centrifugal forces, in which the apparatus includes an improved conveyor that facilitates removal of the labels from the conveyor, in which the labels are more positively inserted into the mold cavities, in which the speed of label application can be more accurately synchronized with respect to the operation of the blow molding machine, in which the placement of the labels onto the conveyor is more accurate, in which removal of labels from the magazine and placement of the labels on the conveyor are achieved substantially simultaneously thereby optimizing the time available for picking a label and placement of labels on the conveyor, and in which control of the labels during insertion is facilitated and label slippage is minimized.

Apparatus for applying labels in the mold sections of a blow molding machine in accordance with a presently preferred embodiment of the invention herein disclosed generally includes three sections: An indexer with pick-up heads for successively removing labels from a magazine and placing the labels onto a conveyor, a conveyor for moving the labels from the indexer to a position adjacent to the mold sections, and an inserter for successively removing the labels from the conveyor and inserting them into the mold sections. Various aspects of the present invention contemplate improvements in the individual portions or sections of the placement apparatus, as well as improvements in the apparatus as a whole and the method of operating the same. Most preferably, dual placement apparatus are provided for inserting labels into both opposed sections of a mold structure.

In accordance with a presently preferred embodiment of the invention, the label pickup mechanism includes heads that are coupled to a slider/crank indexing arrangement for positively driven straight-line motions to pickup or remove successive labels from a magazine and deposit the labels in turn on the conveyor. The label pickup mechanism is driven by a servo motor, which permits accurate and variable control of speed together with facility to vary the pickup cycle. The slider/crank arrangement is such as to lock the pickup heads into a cam track on the indexer, and thereby restrain the pickup heads from moving outwardly due to centrifugal force or otherwise as the indexer is rotated. Weight of the labels does not affect label pickup or placement.

The magazine is preferably disposed in horizontal orientation adjacent to one end of the conveyor, and pickup of the labels from the magazine and placement onto the conveyor are accomplished simultaneously. Such arrangement best utilizes the time available for label pickup and placement. Further, labels are placed on the conveyor while the conveyor is held stationary, which permits better control over accuracy of label placement. The pickup heads are coupled through a rotary union on the indexer drive for applying vacuum to the heads as the heads engage labels in the magazine, and positive air pressure to the heads as the heads are moved against the stationary conveyor. This arrangement enhances pick-up and placement of the labels.

The label conveyor has two vacuum sections The first section extends from the pickup indexer and holds the labels on the conveyor belt as the belt is indexed from adjacent to the pickup mechanism toward the mold wheels A separate vacuum section at the label inserter position may be connected to a valve arrangement so that the vacuum may be turned off when the inserter head engages the label This minimizes slippage of the label on the inserter head as the label is removed from the conveyor. The label inserter is driven by a servo motor that is electronically coupled to the mold wheel In this way, the inserter motor rotates in synchronism with the mold wheel As the mold wheel changes speed, so does the inserter drive motor Further, use of a servo motor readily accommodates variation in motion of the inserter head for placement of the labels into the mold sections.

BRIEF DESCRIPTION OF THE DRAWINGS

The invention, together with additional objects, features and advantages thereof, will be best understood from the following description, the appended claims and the accompanying drawings in which:

FIGS. 22A and 22B together form a schematic diagram of the pneumatic circuits and the label delivery apparatus of FIGS. 1-21:

DETAILED DESCRIPTION OF THE PREFERRED EMBODIMENT

Figure 1:
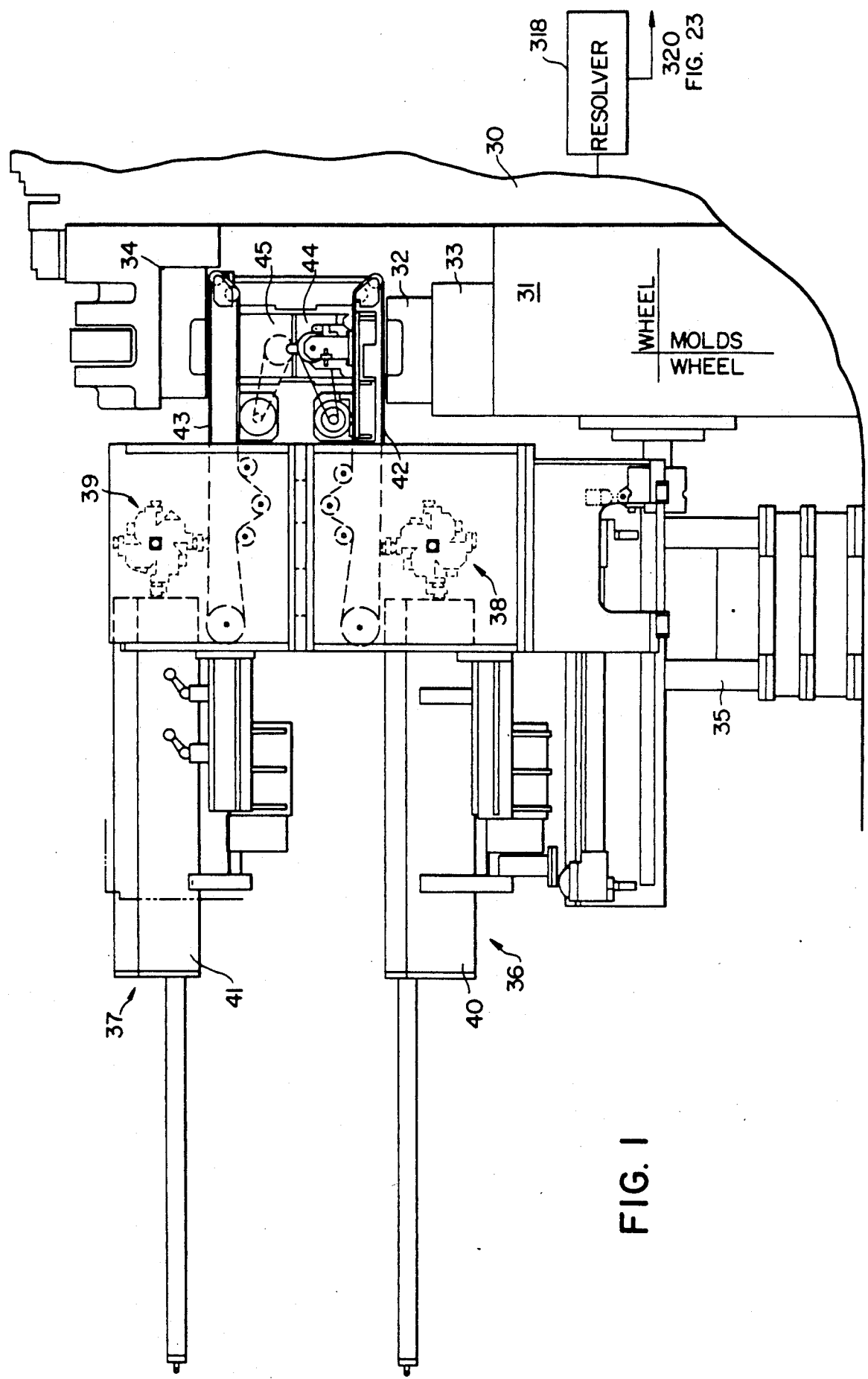
FIG. 1 is a fragmentary partly diagrammatic side elevational view of a blow molding machine embodying the label delivery apparatus of the present invention.
Figure 2:
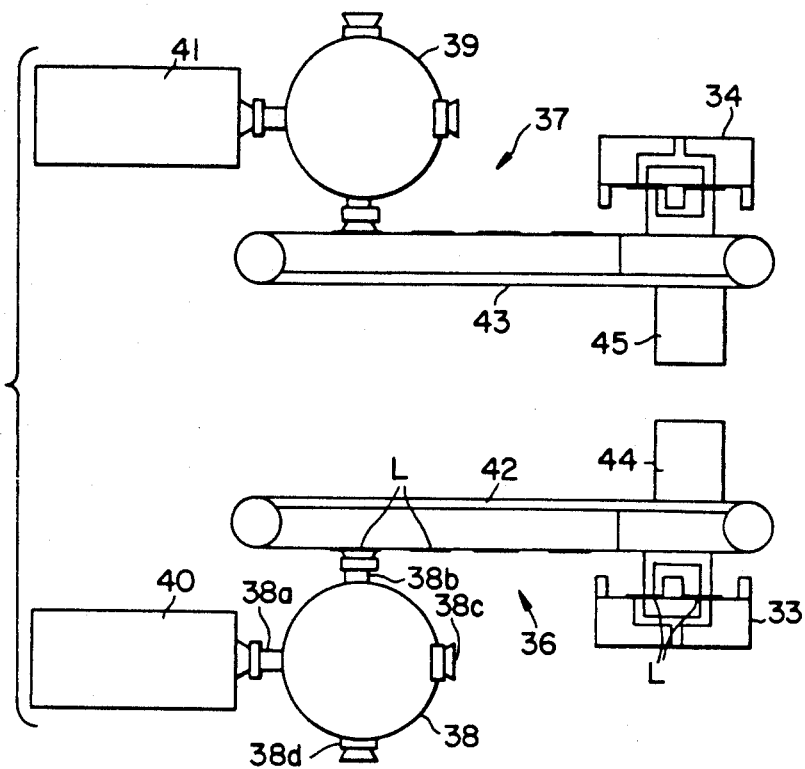
FIGS. 2-5 are schematic views showing operation of the label delivery apparatus.

Referring to FIG. 1, the invention is particularly applicable to a blow molding machine of the type that comprises a wheel plate 30 which is mounted on a shaft 31 extending horizontally for rotation on a frame. A plurality of sets of molds are provided in circumferentialy spaced relation about the wheel plate 30, each et comprising a pair of mold sections. The first mold section 32 is mounted on the hub 33 of shaft 31, and the second mold section 34 is mounted on wheel plate 30 in radial alignment with first mold section 32. Mold section 34 is movable toward and away from mold section 32 to close and open the mold. As the wheel rotates, at the three o'clock position where the molds are open, an extruder (not shown) delivers a parison between open mold sections so that, when the mold is closed, the parison can be blown to form a hollow article such as a container. At the twelve o'clock position, the hollow articles are removed. The blow molding machine per se is more fully shown in U.S. Pat. Nos. 4,523,904, 4,549,965, and 4,680,000, which are incorporated herein by reference.

In accordance with the present invention, apparatus is provided for successively delivering one or more labels between the open mold sections at a position prior to delivery of the parison. Referring to FIG. 1, the apparatus is shown for delivering two labels, one to the cavity of each mold section, and comprises a base 35 which supports a lower label mechanism 36 and an upper label mechanism 37. Each of the mechanisms 36, 37 includes a vacuum pickup mechanism 38, 39 that removes labels successively from an associated magazine 40, 41 and deposits them in spaced relation on an associated vacuum conveyor 42, 43. Conveyors 42, 43 deliver the labels successively to a point adjacent to open mold sections 32, 34, and a label placement mechanism 44, 45 associated with each label mechanism 36, 37 operates to remove each label from its respective conveyor 42, 43 and deliver it to its respective mold section 32, 34. The lower and upper delivery mechanisms 36, 37 are mounted on a carriage for movement toward and away from the blow molding machine, so that they can be simultaneously removed when they are not to be used or to provide access to the machine. The mechanism for moving the delivery mechanisms is shown and described in U.S. Pat. No. 4,680,000. Upper and lower label delivery mechanisms 36, 37 are essentially mirror images of the other. For purposes of clarity, only the lower mechanism will be described in detail in conjunction with FIGS. 6-21.

FIGS. 2-5 diagrammatically illustrate structure and operation of the label delivery mechanism of the present invention, structural details of which will be described in greater detail in conjunction with FIGS. 6-23. Indexer/pickup 38 carries an orthogonally spaced array of pickup heads 38a, 38b, 38c and 38d. Each of the heads 38a-38d is carried for individual radial movement to positions to engage labels in magazine 40 and to deposit the labels on the under surface of conveyor 42, and the pickup heads are simultaneously carried for conjoint rotary movement about the axis of pickup mechanism 38. Labels L successively deposited on conveyor 42 are carried thereby to a position adjacent to mold cavity section 33, at which position inserter 44 removes the labels from the conveyor mechanism and deposits the labels against the opposing surface of mold section 32. Conveyor 42 has first and second vacuum sections 42a, 42b. Sections 42a, 42b may be coupled to a common vacuum source. Alternatively, vacuum may be continually applied to section 42a adjacent to pickup 38, and vacuum may be selectively applied to section 42b for holding labels in place and removed to facilitate pickup by inserter 44 and placement in mold section 32.

Figure 3:
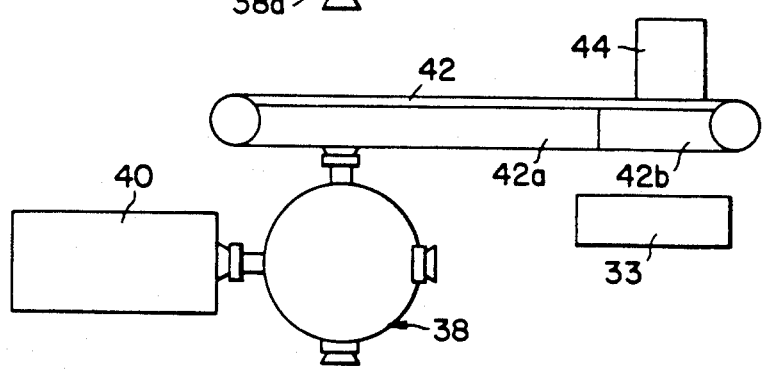
Figure 4:
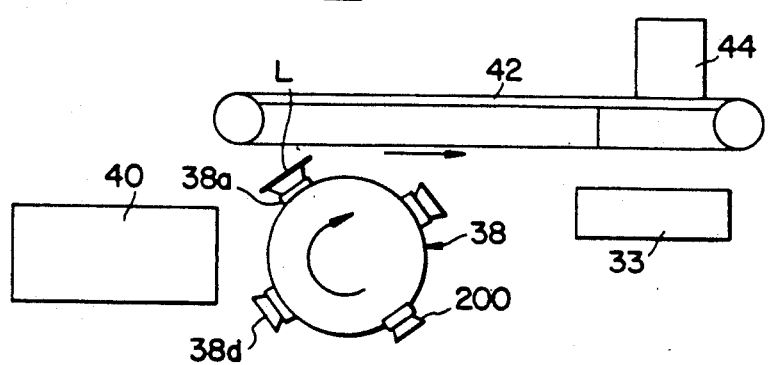
Figure 5:
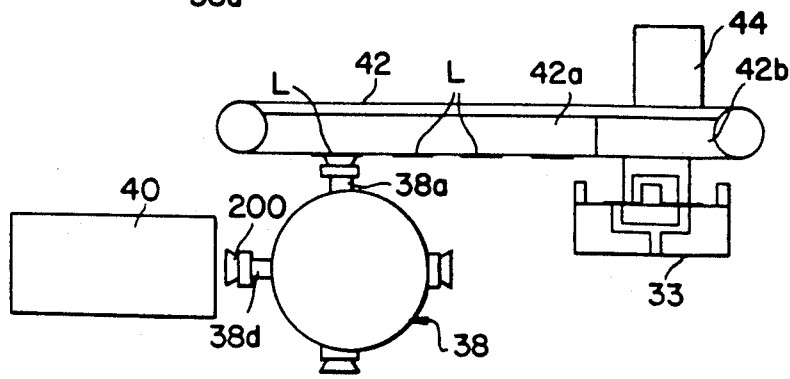
Figure 6:
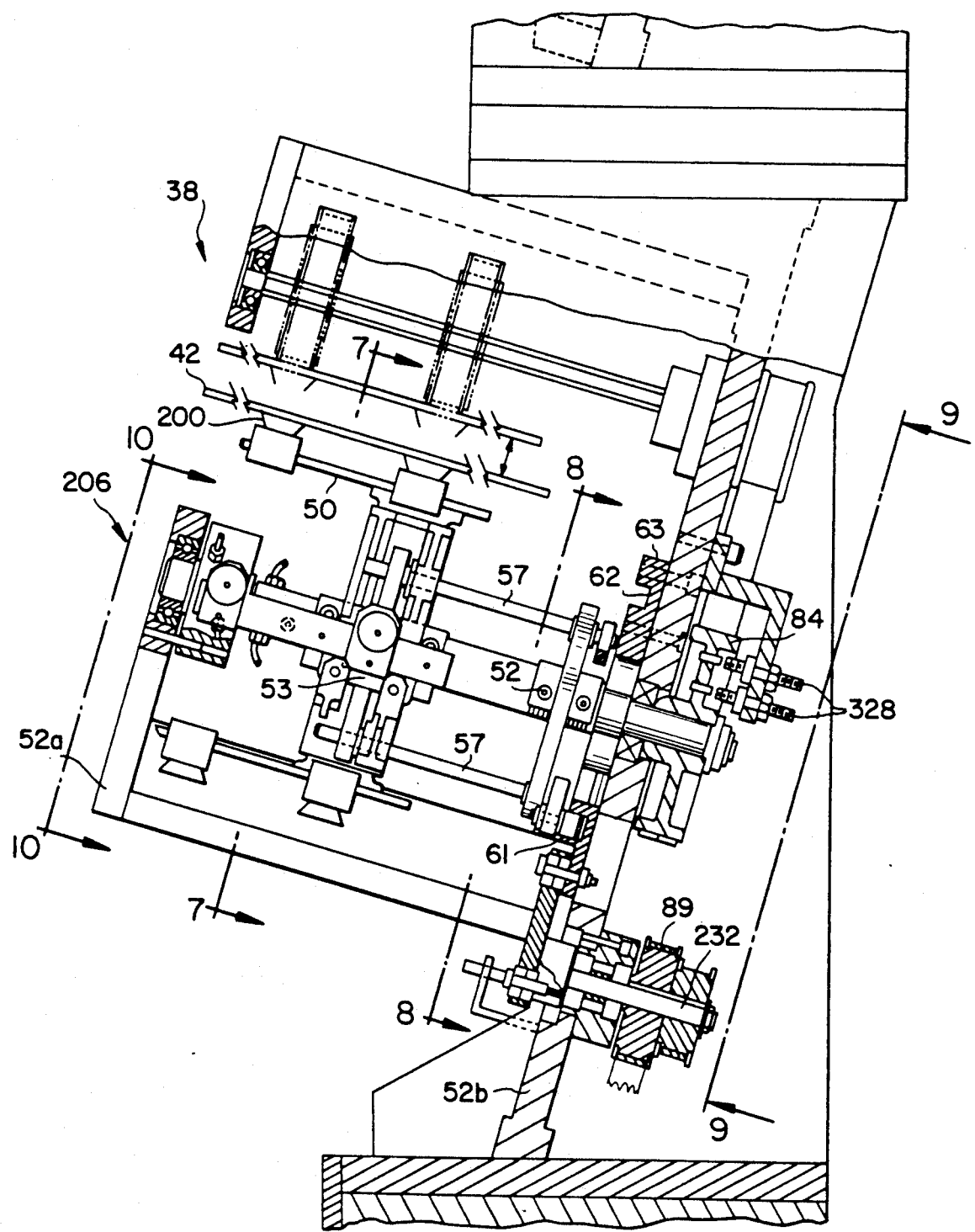
FIG. 6 is a sectional view of a label pickup mechanism taken substantially along the line 6—6 in FIG. 9.

More particularly, and referring to FIG. 3, with conveyor 42 initially empty, indexer 38 is initially positioned with head 38a adjacent to and aligned with magazine 40. Head 38a is extended radially and vacuum applied thereto to pickup the label at the end of the magazine. Head 38a is then retracted, and pickup/indexer 38 is rotated clockwise (FIG. 4) to move label L to a position adjacent to conveyor 42, and at the same time to bring pickup head 38d to a position adjacent to magazine 40. At the same time, conveyor 42 is indexed one position toward mold section 33. After indexer/pickup 38 has moved 90° and conveyor 42 has indexed one position, motion is arrested (FIG. 5). Head 38a is then extended radially to position label L on conveyor 42. Vacuum is then removed from head 38a and positive air pressure is applied thereto so as to transfer label L from head 38a to conveyor 42, where the label is held in position by vacuum applied to conveyor section 42a. At the same time, pickup head 38d is extended radially to engage the front label in magazine 40, and vacuum is applied to head 38d to remove a label from the magazine. Heads 38a, 38d are then retracted, indexer 38 is rotated clockwise (FIG. 4) and the process is repeated.

At the same time as labels L are being removed from magazine 40 and placed on conveyor 42—i.e., while conveyor 42 is stationary—inserter 44 is activated to remove labels L from conveyor 42 and insert the labels into mold section 33. The inserter has a vacuum cup which grabs the label and removes it from the conveyor. Vacuum applied to the mold sections hold the label in place when the inserter head is withdrawn. (It will be recognized that the schematic drawings of FIGS. 2-5 illustrate a dual-section mold arrangement, with which the present invention may be readily utilized. The detailed drawings of FIGS. 1 and 6-20 illustrate a single-section mold arrangement in conjunction with which use is presently preferred. FIGS. 18-21 illustrate a dual mold label placement arrangement.) The dual section conveyor has the advantage that vacuum may be selectively removed from section 42b to assist removal of label L by inserter 44.

Pickup/indexer mechanism 38 is illustrated in detail in FIGS. 6-17. Each pickup head 38a14 38d includes a pair of V-shaped vacuum cups 200 (FIGS. 6 and 7) carried by an arm 50 that is cantilevered from a pair of bars 51. The radially inner end of each bar 51 is coupled to a slide 56 that is moveable along an associated guide rod 55, bar 51 and associated guide rod 55 being parallel to each other and extending radially of the mechanism drive shaft 52. Each rod 55 is embraced by a carrier 54 that is affixed at its inner end to shaft 52 by bolts 202. A link 204 extends from the axially inner end of each bar 51 to a shaft 57, which is rotatably journaled on carrier 54 and rotatably coupled to link 204. In this way, rotation of shaft 57 (by means to be described) pivots link 204 and urges bar 51 and arm 50 radially inwardly and outwardly, with bar and arm motion being guided by slide 56 on rod 55.

Figure 11:
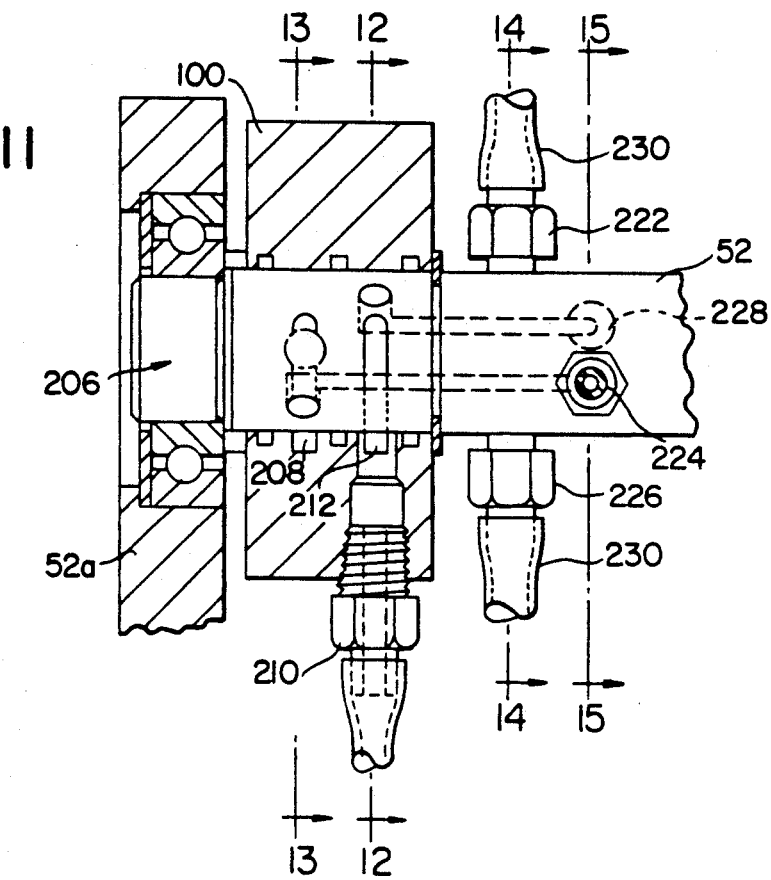
FIG. 11 is a fragmentary sectional view taken along the line 11—11 in FIG. 10.
Figure 12:
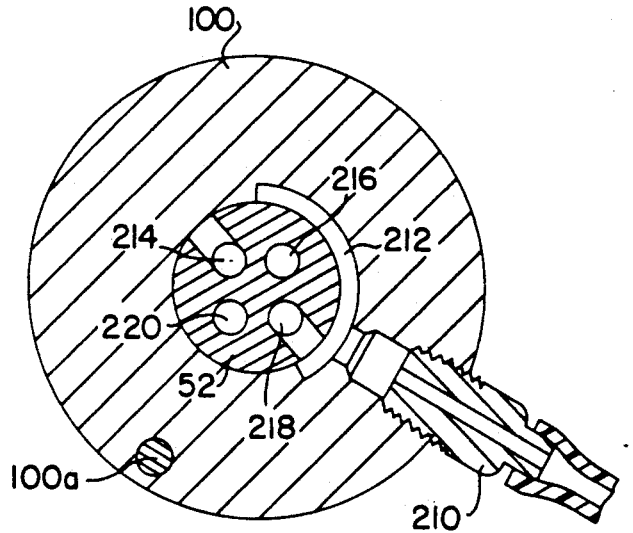
FIG. 12 is a fragmentary sectional view taken along the line 12—12 in FIG. 11.
Figure 13:
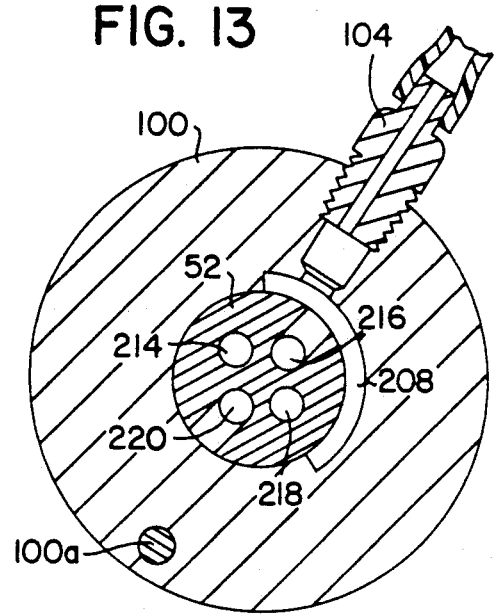
FIG. 13 is a fragmentary sectional view taken along the line 13—13 in FIG. 11.
Figure 10:
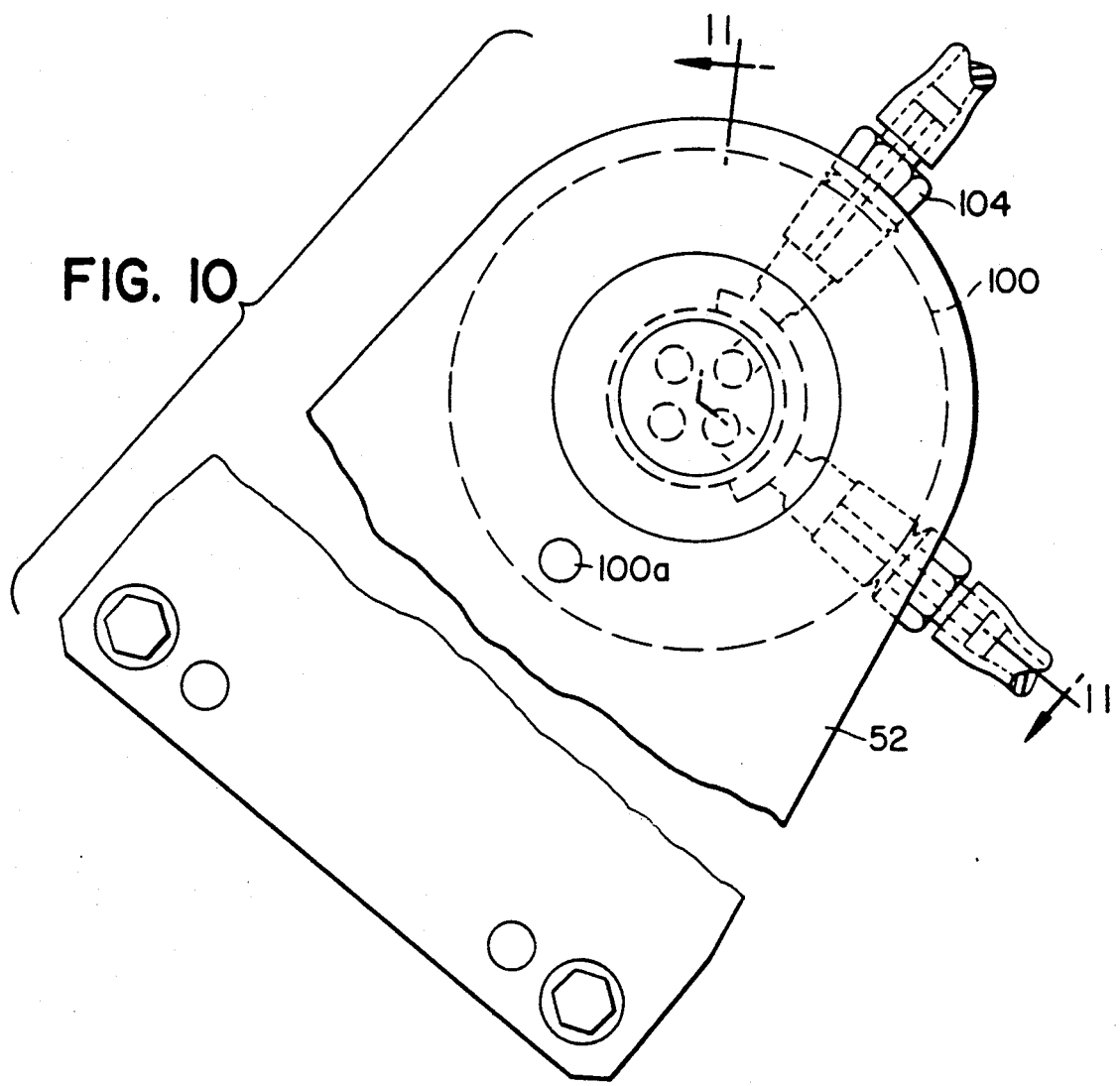
FIG. 10 is a fragmentary sectional view taken along the line 10—10 in FIG. 6.
Figure 14:
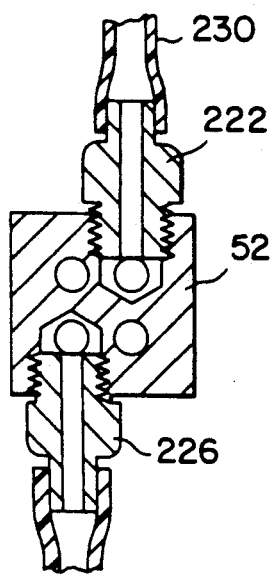
FIG. 14 is a fragmentary sectional view taken along the line 14—14 in FIG 11.
Figure 15:
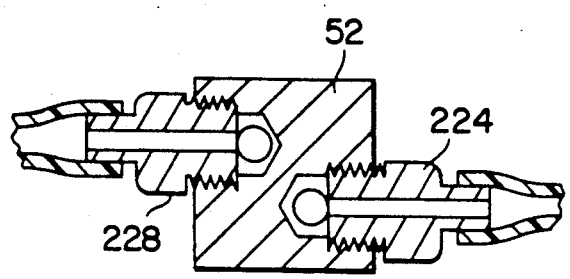
FIG. 15 is a fragmentary sectional view taken along the line 15—15 in FIG. 11.
Figure 16:
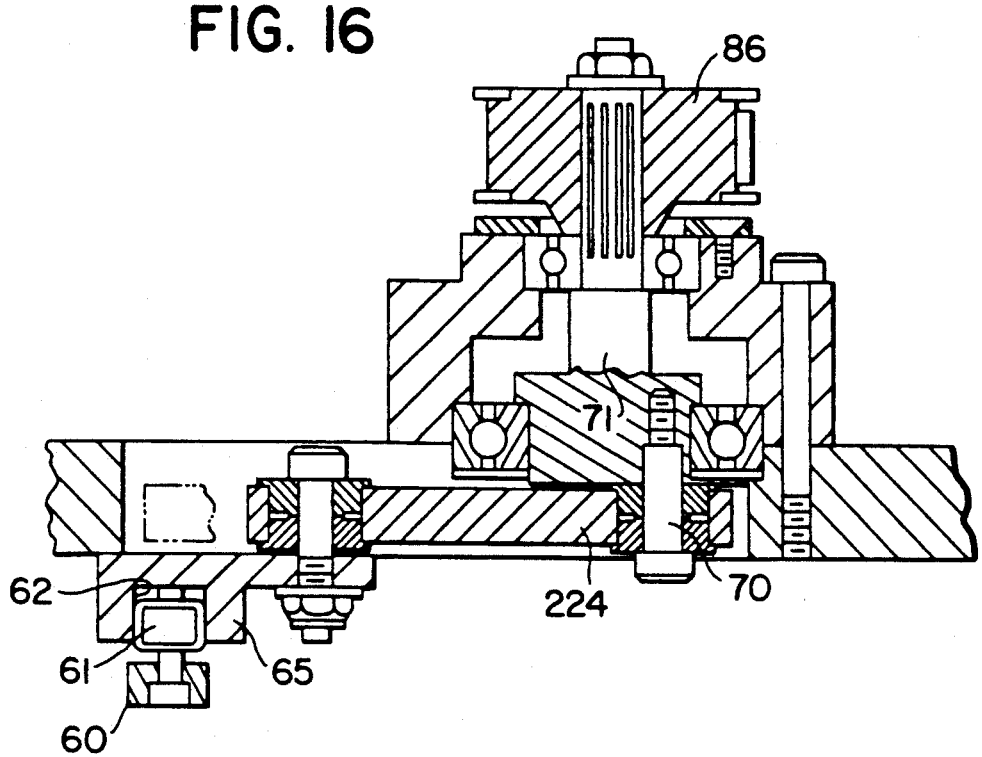
FIG. 16 is a fragmentary sectional view taken along the line 16—16 in FIG. 8.
Figure 17:
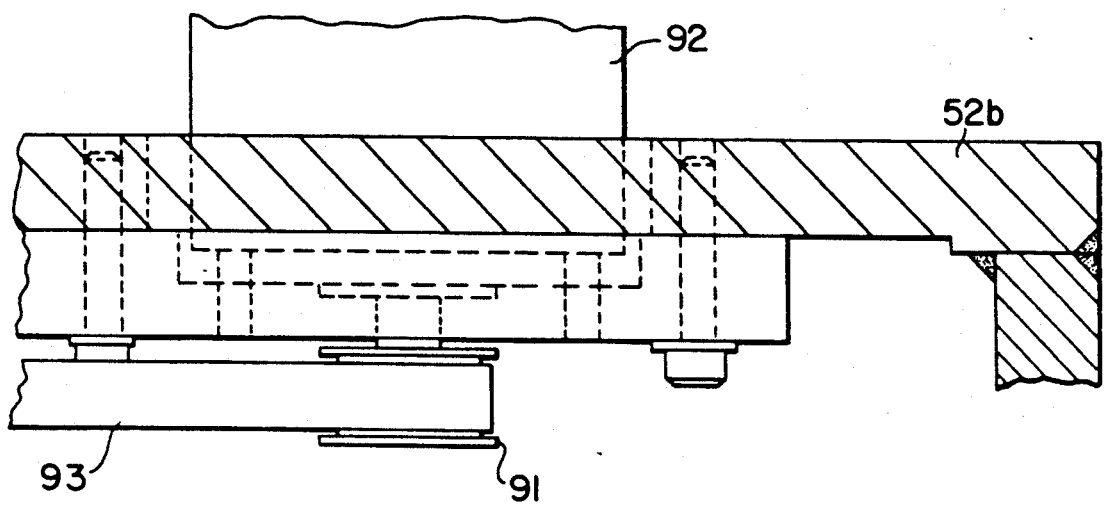
FIG. 17 is a fragmentary sectional view taken along the line 17—17 in FIG. 9.
Figure 18:
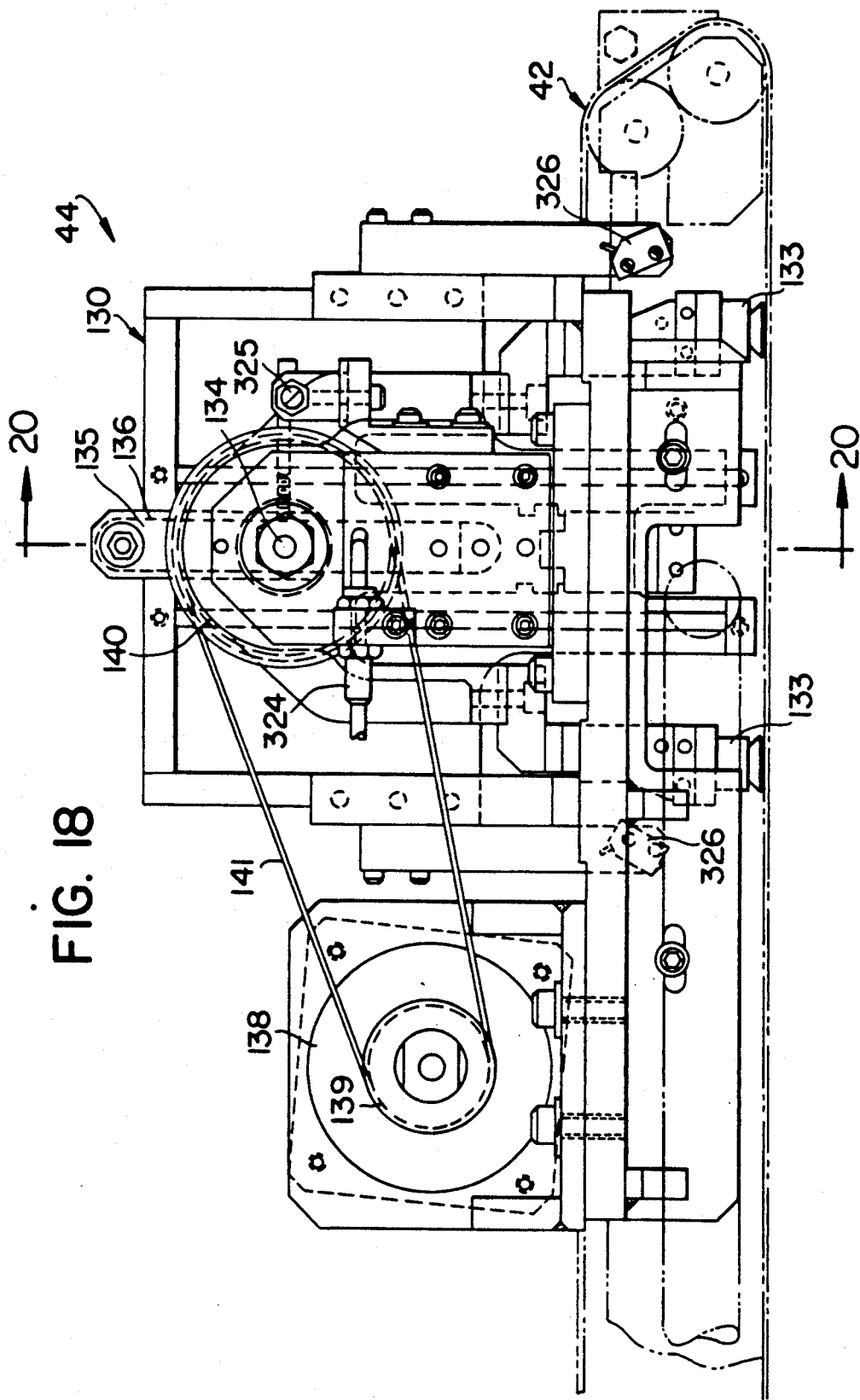
FIG. 18 is a elevational view of the label placement mechanism.
Figure 19:
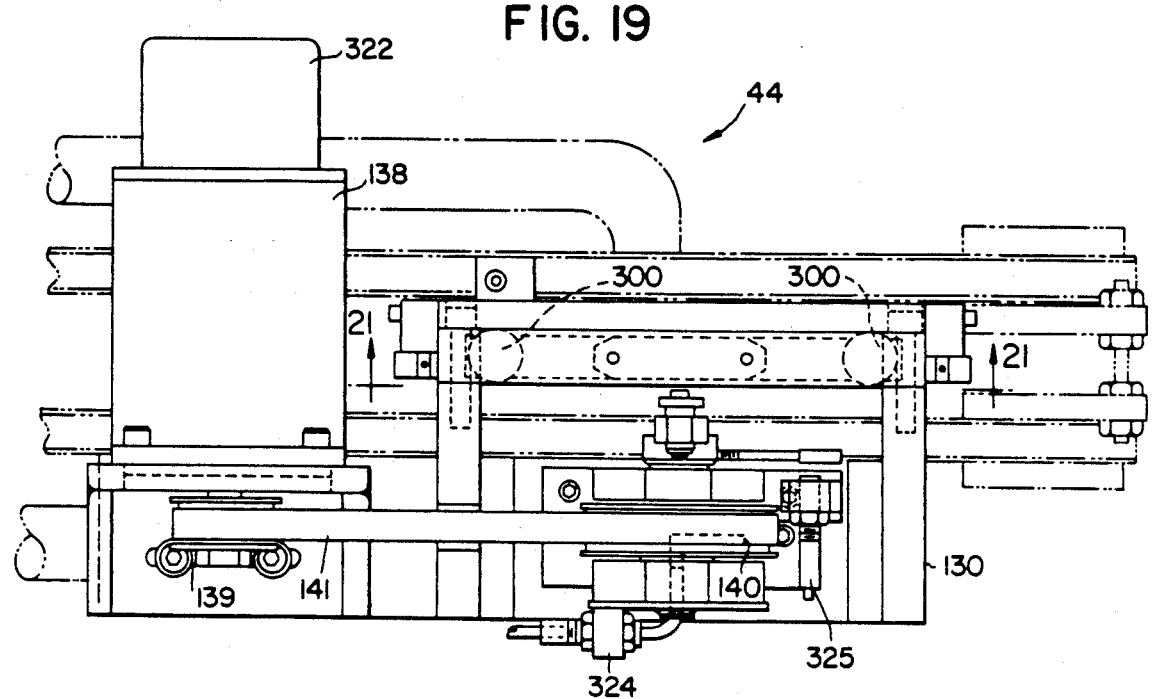
FIG. 19 is a top plan view of the mechanism shown in FIG. 18.
Figure 20:
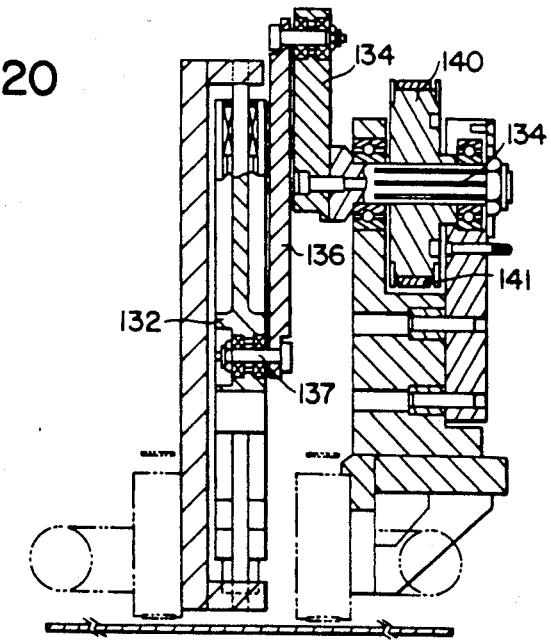
FIG. 20 is a fragmentary sectional view taken along the line 20—20 in FIG. 18.
Figure 21:
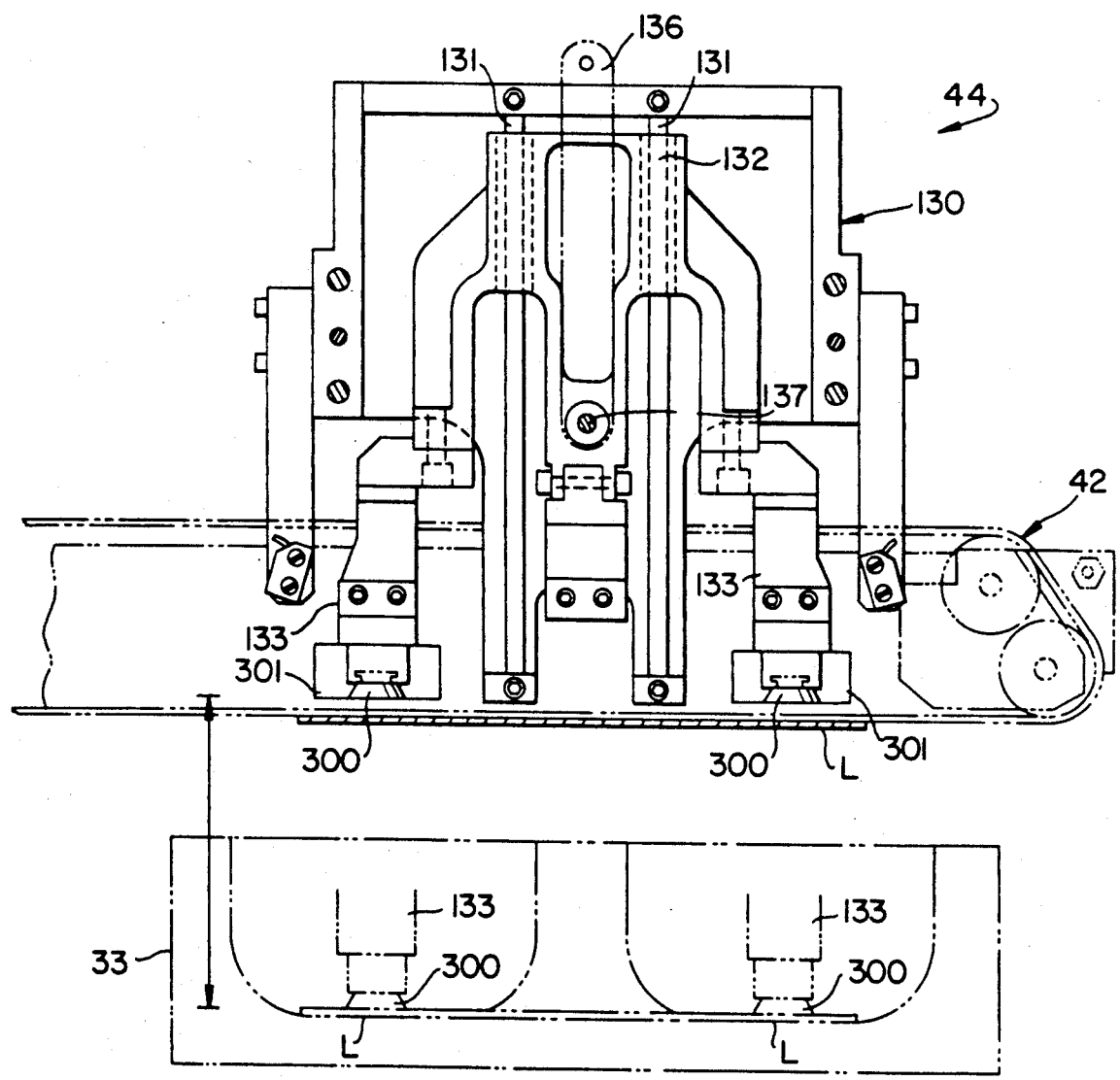
FIG. 21 is a fragmentary sectional view taken along the line 21—21 in FIG. 19.

Mechanism drive shaft 52 is rotatably journaled at one end in a support 52b (FIG. 6), and at the other end is coupled to a rotary union 206 (FIGS. 6, 11 and 12) rotatably journaled in a support 52a. Rotary union 206 includes a manifold collar 100 that surrounds shaft 52 adjacent to support 52a and is coupled thereto against rotation by the pin 100a (FIGS. 10 and 12-13). A first fitting 104 (FIGS. 10 and 12 on manifold 100 communicates with an arcuate internal manifold passage 208 (FIGS. 11 and 13). A second fitting 210 (FIGS. 10-12) is carried on manifold 100 and communicates with a second arcuate passage 212 surrounding shaft 52 and axially spaced from passage 208. Four angularly spaced axial air passages 214-220 extend within shaft 52. Passages 214, 218 open radially outwardly adjacent to each other at an axial position radially inwardly of fitting 210, as best seen in FIG. 12. Likewise, passages 216, 220 open radially outwardly at an axial position radially inwardly adjacent to fitting 104 (FIG. 13). Thus, in the specific position of shaft 52 illustrated in FIGS. 10-13, axial passage 218 is connected by arcuate passage 212 in manifold 100 to fitting 210 (FIG. 12), and axial passage 216 is connected by arcuate passage 208 in manifold 100 to fitting 104 (FIG. 13).

The opposing end of each axial shaft passage 214-220 terminates axially inwardly of manifold 100 in an associated fitting 222, 224, 226 and 228 (FIGS. 11 and 14-15) extending radially from and fixed to the shaft. Each fitting 222-228 is connected by an associated air hose 230 (FIGS. 7, 11 and 14-15) to a fitting 232 (FIG. 7) on the arm 50 positioned radially outwardly therefrom. These fittings are connected to cups 200 by fittings 232 (FIG. 7) and hoses 230. Thus, as shaft 52 and pick-up heads 38a-38d rotate, the cups 200 of each pickup head are connected in turn to fittings 104, 210 for selective application of air at vacuum and positive pressure to the cups to facilitate pickup and placement of labels. It will be noted that vacuum may be placed on any part of the label. Any number of cups 200 may be employed for large labels.

A pair of V-shaped shaft supports 64 (FIGS. 6 and 8) are affixed by bolts 220 to shaft 52 internally adjacent to shaft support 52b. The four shafts 57 extend in a direction parallel to shaft 52 and are rotatably supported at the ends of supports 64. Four roller arms 60 are respectively connected at one end to an associated shaft 57. A roller 62 is carried at the opposing end of each arm 60 and positioned in the circular track 62 in cam plate 63. Track 62 is concentric with the axis of shaft 52, and rollers 61 are at 90° spacing from each other.

Figure 7:
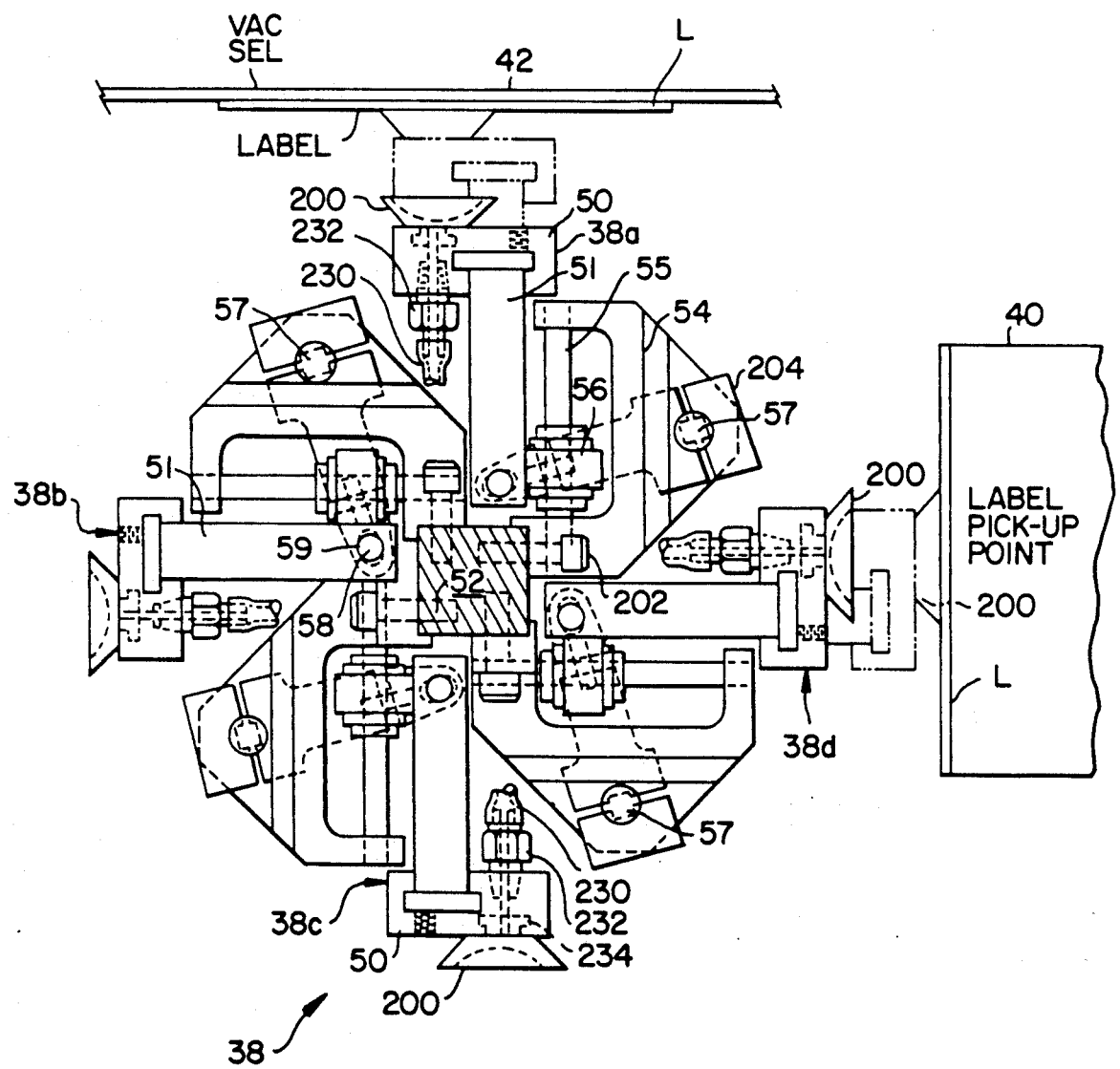
FIG. 7 is a fragmentary sectional view taken along the line 7—7 in FIG. 6.
Figure 8:
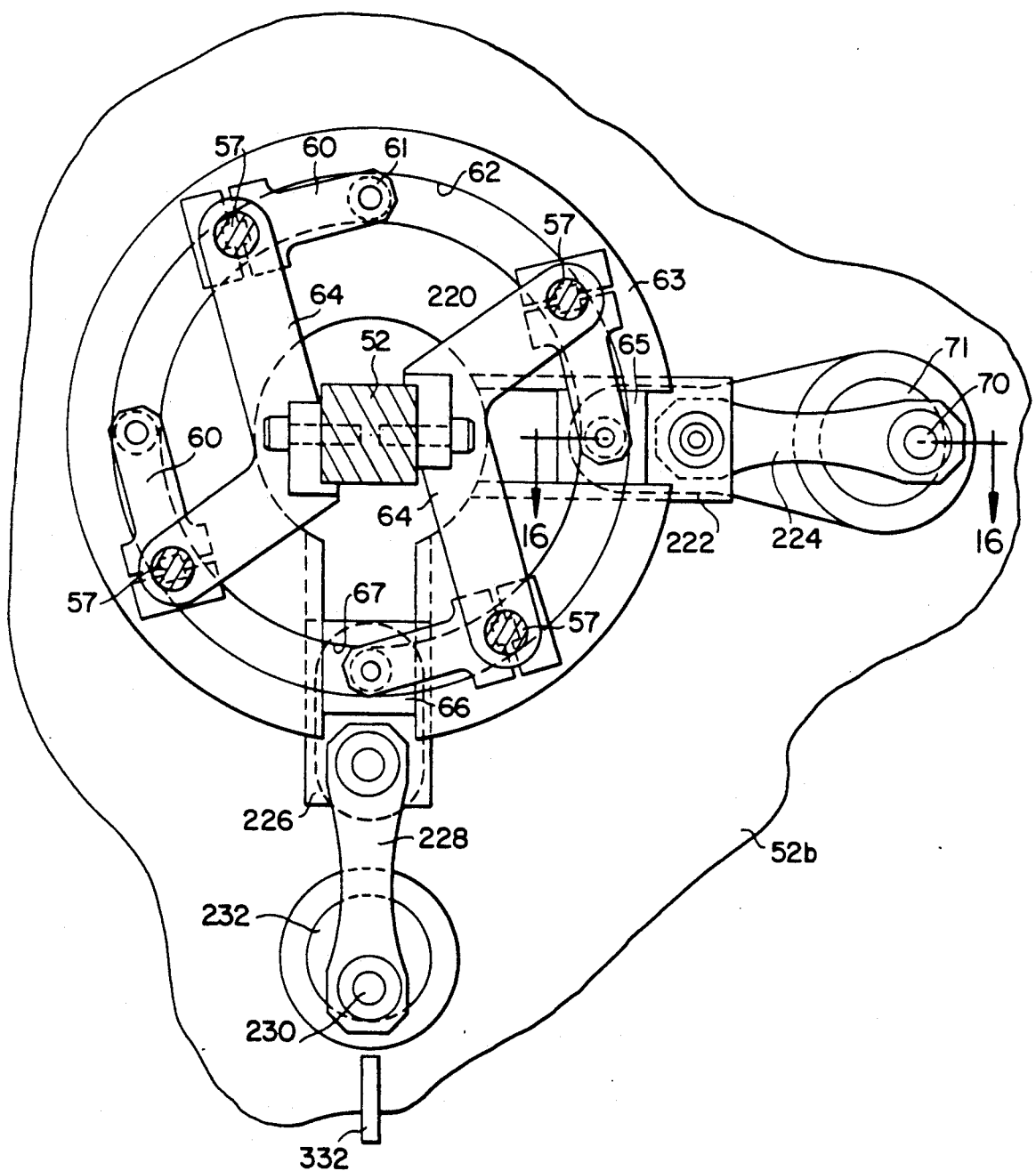
FIG. 8 is a fragmentary sectional view taken along the line 8—8 in FIG. 6.

At orthogonally spaced positions that correspond to the pickup and placement positions of the pickup heads (FIG. 7), cam-track 62 is interrupted by a pair of slides 65, 66 (FIG. 8). Each slide 65, 66 has an arcuate slot 67 that registers with and forms a part of cam-track 62 when slides 65, 66 are in the positions illustrated in FIG. 8. Slide 65 is connected to a link 222, which in turn is pivotally connected by an arm 224 to a block 70 eccentrically mounted on a shaft 71. Likewise, slide 66 is connected by a link 226 and an arm 228 to a block 230 eccentrically mounted on a shaft 232. In the normal positions of slides 65, 66 illustrated in FIG. 8, pick-up heads 38a-38d are in their normal radially inwardly retracted positions illustrated in solid lines in FIG. 7.

When a roller 61 is in position within the arcuate confines of slide 65 and slide 65 is moved radially inwardly of cam-plate 63 by shaft 71, eccentric 70 and arm 224, the shaft 57 coupled to this roller is rotated clockwise in FIG. 8, and in FIG. 7. Such rotation of shaft 57 (FIG. 7) rotates the associated link 204 and urges bar 51 and arm 50 radially outwardly so as to bring cups 200 of head 38a, and a label L carried thereby, into abutting engagement with vacuum conveyor 42. At the same time, slide 66 is moved radially inwardly by eccentric and shaft 232 so as to pivot the associated shaft 57 clockwise in FIGS. 7 and 8, and bring head 38d into abutting engagement with a label L carried by magazine 40 At this time, vacuum is applied to cups 200 of head 38d, by means of fitting 210 and manifold 100, so as to pickup label L in magazine 40 by a suction action against the label At the same time, positive air pressure is applied to cups 200 of head 38a, by means of fitting and manifold 100, so as to enhance the vacuum action of conveyor 42 in transferring the label L from head 38a to conveyor 42. When shafts 71, 232 are rotated to the normal positions of FIG. 8, and slides 65, 66 are returned to the positions illustrated, head 38d is retracted to the position illustrated in FIG. 7 while carrying a label picked up from magazine 40, and head 38a is likewise retracted to the position of FIG. 7 after having deposited its label L onto conveyor 42. In this way, and as previously described in conjunction with FIGS. 2-5, labels L are successively removed from magazine 40 and deposited on conveyor 42.

Figure 9:
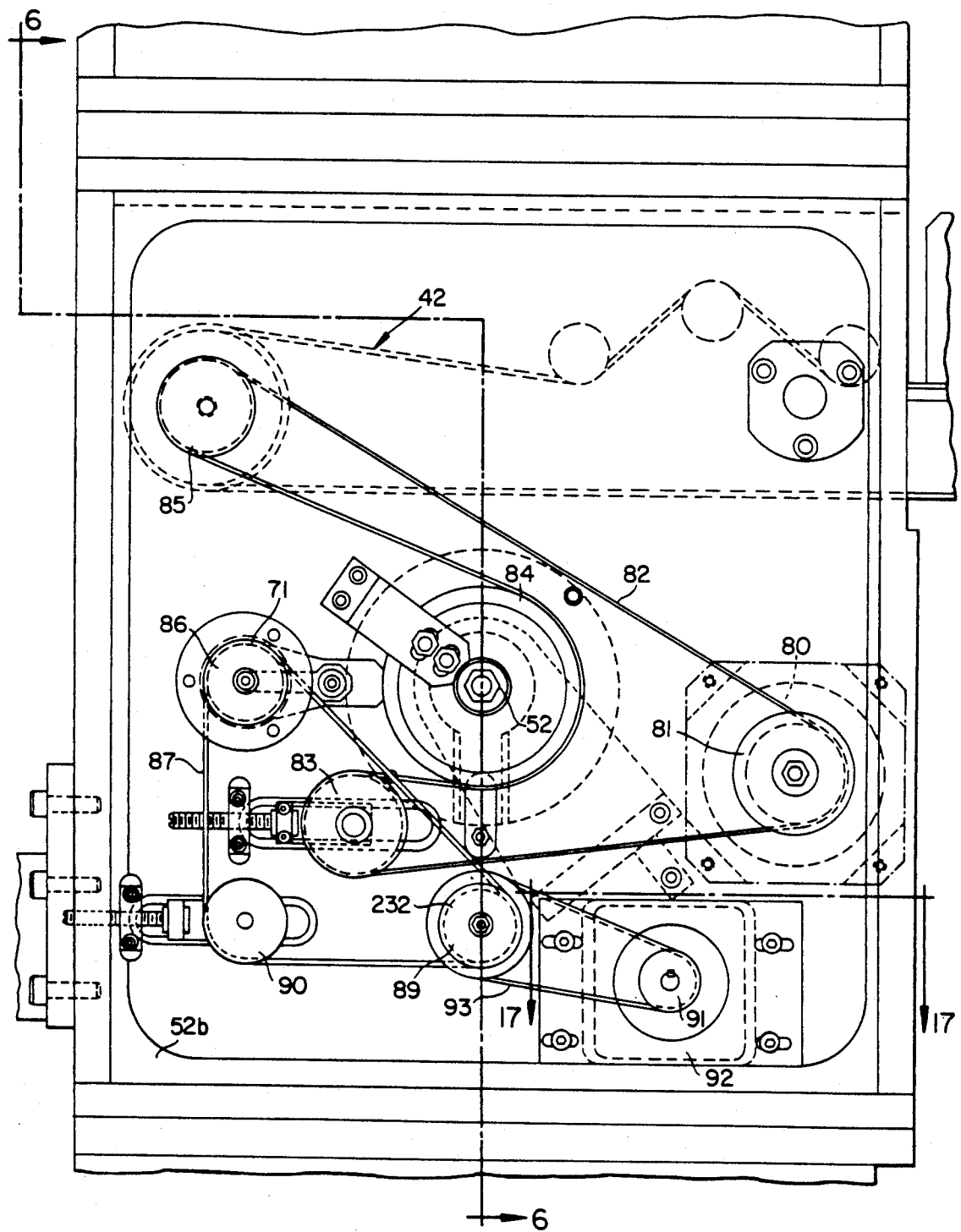
FIG. 9 is a fragmentary view taken along the line 9—9 in FIG. 6.

Referring now to FIGS. 6, 8-9 and 16-17, a drive pulley 84 is affixed to the end of shaft 52 externally of support 52b. An electric servo drive motor 80 is connected to a pulley that drives a belt 82 trained around an idler pulley 83, a second pulley 85 and a drive pulley 84 Thus, pulley 84 and shaft 52 rotate under control of motor 80. Pulley 83 is adjustably mounted on support 52b for controlling belt tension, as best seen in FIG. 9. Pulley 85 drives conveyor 42. Shaft 71 (FIGS. 8 and 16) is coupled to a pulley 86, and shaft 232 (FIGS. 6 and 18) is coupled to a pulley 89 A belt 87 is trained around pulleys 86, 89, and around an idler pulley 90. A second belt 93 extends from pulley 89 to a pulley 91 coupled to an electric servo motor 92 (FIG. 9). Pulley 90 is adjustably mounted on support 52b for controlling tension in belt 87. Thus, rotation of pulleys 86, 89, and consequent positioning of slides 65, 66 as previously described, it is controlled by motor 92. The belts and pulleys are changeable for different label size ranges when using the mechanism for single cavity operation. No better pulley changes are required for dual-cavity operation.

Label inserter 44 will be described in detail in conjunction with FIGS. 18-21, inserter 45 (FIG. 1) being the mirror image thereof as previously indicated. Inserter 44 includes a frame 130 that supports a pair of laterally spaced vertically oriented guide rods 131. A support 132 is slidably journaled on guide rods 131 and carries a pair of downwardly extending laterally spaced inserter head assemblies 133. Each head 133 terminates in a downwardly projecting V-shaped cup 300 surrounded by a foam pad 301. Pads 301 spread the label placement force over a larger area. Air passages in support 132 and heads 133 connect cups 300 to a vacuum/air pressure source, as will described in conjunction with FIG. 22. A drive shaft 134 (FIGS. and 20) is carried by frame 130 and is drivably coupled by a pulley 140 and a drive belt 141 to the pulley 139 affixed to the output shaft of an electric servo motor 138. A crank arm 135 is coupled to shaft 134 and to a crank 136 pivotally mounted at 137 to support 132. Thus, rotation of shaft of 134 translates through crank arms 135, 136 into downward reciprocation of heads 133 and cups 300. Although the inserter shown in FIGS. 18-21 is for a double mold arrangement, the same can be converted for single mold operation employing a single centrally located vacuum pad. The dual label machine can operate if one label is missing; a single label machine shuts down if the label is missing. In operation, the inserter moves slowly until the label is removed from the conveyor, and then accelerates to normal speed. Precise and programmable velocity control is obtained by using servo motors and associated electronics, as will be described.

FIGS. 22A and 22B form a schematic diagram of the pneumatic circuits of the label delivery apparatus. The carriage that supports the label placement apparatus (FIG. 1) is selectively engaged in the position illustrated in FIG. 1, or disengaged to the retracted position, under control of a solenoid-operated directional valve 302 and needle vavles 303 that adjust carriage speed. Vacuum for conveyors 42,43 is supplied by a vacuum blower 305 (FIG. 22B). Label magazine 40 includes a pneumatic cylinder coupled to a directional valve 304 for urging labels toward the dispensing end, and a riffle block at the dispensing end for separating labels singly from the magazine. A pair of directional valves 306, 308 selectively connect air under pressure and under vacuum through rotary union 206 to the pick heads of index/pickup unit 38. The pneumatic circuits for the upper label placement mechanism are identical to those illustrated in FIG. 22. Air under vacuum is fed by a pair of directional valves 310, 312 to the inserter heads of inserter unit 44. An accumulator 311,312 is connected to each valve 310,112. These accumulators reliably release the vacuum on the label so that the label is released from the cups at the same time as blow off air is supplied.

Figure 23:
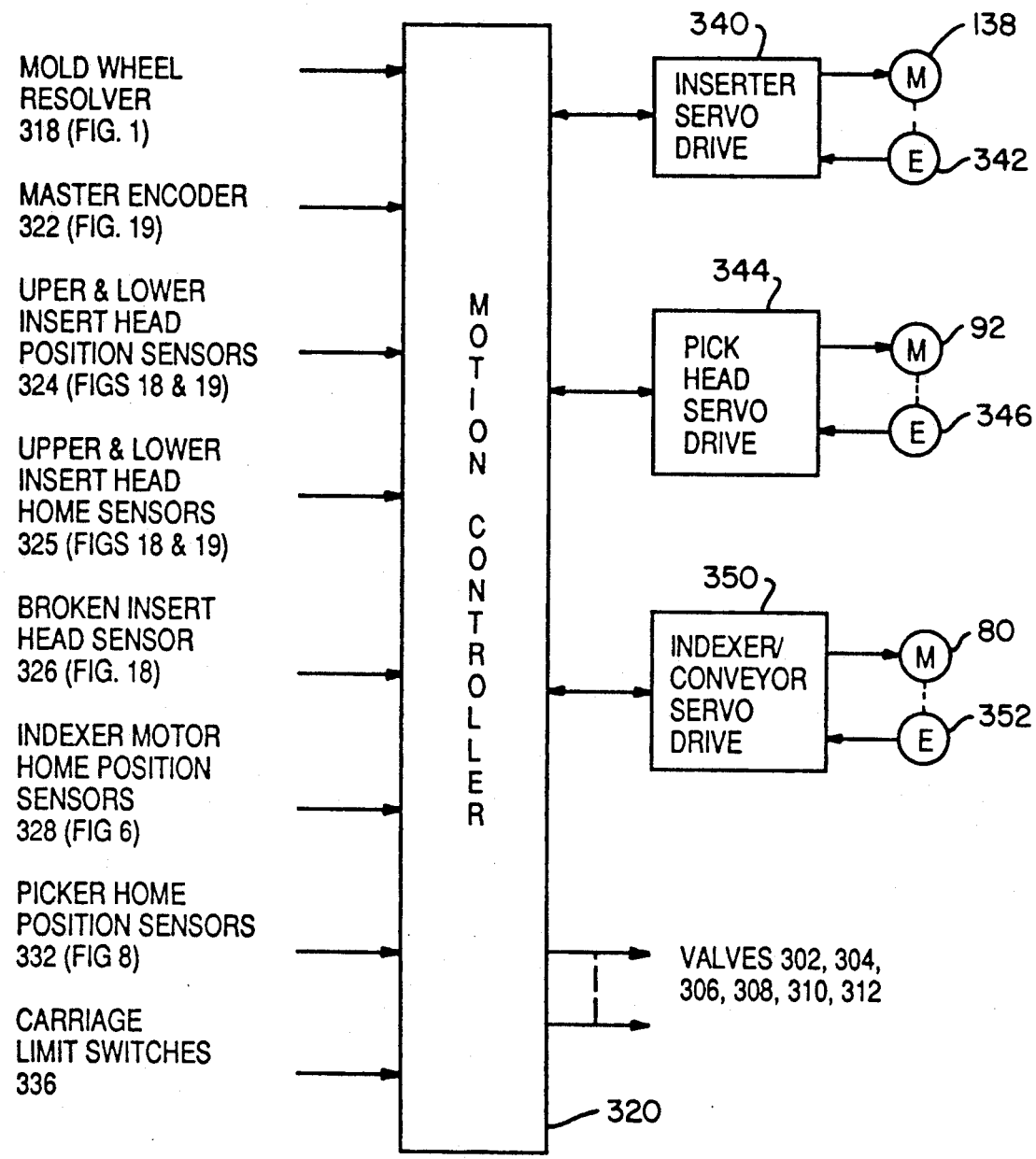
FIG. 23 is a functional block diagram of the apparatus control electronics.

FIG. 23 is a functional block diagram of the apparatus control electronics. A resolver is coupled to mold wheel 30 for feeding signals indicative of mold wheel rotation to a motion controller 320. An encoder 322 (FIG. 9) is coupled to inserter motor 138, and feeds a corresponding signal to motion controller 320 as a function of inserter motion. In this way, motion at the inserter axis is compared with motion at the mold wheel, and the inserter motion is synchronized to motion of the mold segments. A pair of insert head position sensors 324 and inserter home position sensors 325 (FIGS. 18 and 19) are respectively positioned on the upper and lower inserter heads and are responsive to grooves on pulley 140. Sensors 324 allow the inserter heads to be moved to the fully retracted position when desired without moving further into the mold. A pair of sensors 326 (FIG. 18) are mounted on each inserter frame to sense each inserter head 133. When the inserter is in the fully retracted or home position, the sensors detect proximity of the inserter heads. If a head is broken, motion controller 320 stops all further motion and advises the operator of a broken inserter head condition.

A pair of proximity sensors 328 (FIG. 6) are responsive to position of pickup drive pulley 84 for sensing home position of each indexer/pickup mechanism and positions of the four pickup heads. Two sensors 332 (FIG. 8) sense home position for the upper and lower picker assemblies. Two limit switches 336 (FIG. 23) are mounted on the base of the mechanism to sense when the carriage is engaged or disengaged.

Motor controller 320 has an output coupled to an inserter servo drive circuit 340, and thence to inserter motor 138. An encoder 342 provides feedback to servo drive 340 as a function of motor position. Likewise, an output of motor controller 320 is connected to picker motor servo drive circuit 344, and thence to motor 92, again with encoder feedback 346 to servo drive 344. An indexer and conveyor drive motor 80 is coupled to conveyor 42 (FIGS. 1 and 2) and controlled by an servo drive circuit 350 and a feedback encoder 352. Motor 138 is slaved to the mold wheel (encoder). Motors 80,92 receive their start signals from the servo controls and execute a preplanned program. Motors 80,92 do not speed up or slow down as mold wheel speed changes Only motor 138 follows mold wheel speed. Motors 80,92 are programmed to run fast enough to accommodate maximum desired labeling speed.

The invention claimed as:

1. In a blow molding machine, the combination comprising at least one set of mold sections movable between a spaced-apart open position for receiving a parison and a closed position to form a cavity for enclosing the parison to be blown outwardly against the confines of said cavity, and in-mold labeling apparatus comprising:

a first source of labels,
   first conveyor means having a first end adjacent to said first source and a second end adjacent to said mold sections in said open position,
   first label pickup means positioned adjacent said first end of said conveyor means and including means for engaging a label at said source and depositing the label on said conveyor means at said first end, and
   first label placement means positioned adjacent to said second end of said conveyor means for removing labels from said conveyor means and placing the labels in an open mold section,
   said first conveyor means comprises means for driving said conveyor means intermittently from said first end toward said second end of said conveyor means,
   said first pickup means comprising at least one pickup head,
   vacuum means on said head for selectively grasping and releasing a label,
   means for intermittently moving said head between a position adjacent to said first source and a position adjacent said first end of said conveyor means, and
   synchronizing means synchronizing motion of said pickup head to the motion of said conveyor means and to the motion of said selectively grasping and releasing mean such that both said pickup means and said first conveyor means are stationary when a label is released from said head onto said conveyor means, and said conveyor and said pickup head are stationary when the label is grasped since grasping and releasing are done at the same time,
   said first pickup means comprising means for mounting said head for rotation in the same direction as movement of said conveyor means and for radial movement,
   means for intermittently rotating said head between a position adjacent to said first source and a position adjacent to said first conveyor means, and means for intermittently moving said head in a radial direction between an inner position and an outer position,
   means for constraining said head motion to said radial direction only,
   said first pickup means further comprises means coupled to said radially moving means and to said synchronizing means for rotating said head and advancing said conveyor means simultaneously and for moving said head radially only when said conveyor means is stationary and said pickup means is stationary.

2. The apparatus set forth in claim 1 wherein said first pickup means comprises a plurality of said pickup heads.

3. The apparatus set forth in claim 2 wherein said means for constraining said motion of each of said pickup means to said radial direction comprises an arm on which said vacuum means if mounted, a pair of bars on which said arm is cantilever mounted, a slide to which one end of each bar is coupled, a slide, a guide rod on which said slide is mounted, the other end of each bar being coupled to said slide, and means for reciprocating said slide.

4. The apparatus set forth in claim 3 wherein said means for reciprocating said slide comprises a rotatable shaft and a link between said shaft and said slide.

5. The apparatus set forth in claim 1 wherein said head comprises a vacuum cup, and wherein said selectively grasping and releasing means comprises means for applying vacuum to said cup for grasping a label engaged with said cup and means for applying air at positive pressure to said cup for releasing the label into said conveyor means.

6. The apparatus set forth in claim 1 wherein said pickup means comprises at least two of said heads, a cam track, cam means coupling each said head to said cam track, and slide means positioned with respect to said track such that can means coupled to each said head engages associated said slide means simultaneously, such that said heads move radially simultaneously to pickup a label from said source and deposit a label on said conveyor means while said conveyor means is stationary.

7. The apparatus set forth in claim 6 wherein said pickup means comprises four said pickup heads at orthogonally spaced positions around said axis.

8. The apparatus set forth in claim 7 wherein said first source of labels comprises a magazine presenting labels in sequence for pickup by said first pickup means from a substantially horizontal direction.

9. The apparatus set forth in claim 8 wherein said inmold labeling apparatus comprises a second said source of labels, a second said conveyor means, and second said pickup means and second placement means identical to the first said pickup means, first conveyor means and first placement means.

10. The apparatus set forth in claim 1 wherein said means for rotating said pickup head, said means for radially moving said head and said label placement means comprise respective electric motors and electronic control means coupled to said motors for synchronizing operation thereof such that said conveyor means and said pickup means are incremented simultaneously, and said pickup head and said placement means are activated while said conveyor means is stationary.

11. The apparatus set forth in claim 1 wherein said first label placement means includes a vacuum cup for selectively engaging a label on said first conveyor means, said first label placement means includes a foam pad surrounding said cup for supporting said label and allowing the pad to deform distributing the force of insertion of said placement means into the mold section when it places the label against contoured surface of mold.

12. The apparatus set forth in claim 11 wherein said label placement means further comprises means for selectively applying air at vacuum pressure to said cup, including accumulator means and means for selectively connecting said cup to said accumulator means for releasing vacuum at said cup.

13. The apparatus set forth in any one of claims 1-12 wherein said mold sections comprises a plurality of sections mounted on a wheel rotatable about a horizontal axis, and wherein said electronic control means includes means coupled to said wheel for synchronizing operation of said in-mold labeling apparatus to rotation of said wheel.

* * * * *